United States Patent [19]

Dabby et al.

[11] 4,219,274

[45] Aug. 26, 1980

[54] APPARATUS AND METHOD FOR PACKAGING OPTICAL FIBERS

[75] Inventors: Franklin W. Dabby, Woodbridge; Ronald B. Chesler, Cheshire, both of Conn.

[73] Assignee: Times Fiber Communications, Inc., Wallingford, Conn.

[21] Appl. No.: 928,454

[22] Filed: Jul. 27, 1978

[51] Int. Cl.² ............................ G01N 21/01; G01N 21/00
[52] U.S. Cl. ............................................. 356/244; 206/53; 242/115; 356/73.1
[58] Field of Search ............... 356/73.1, 244; 206/53; 242/115, 118.2, 118.11

[56] References Cited

U.S. PATENT DOCUMENTS

| 753,344 | 3/1904 | Witham | 242/115 |
| 3,522,700 | 8/1970 | Fisher, Jr. | 242/118.2 |

FOREIGN PATENT DOCUMENTS 1145624  10/1957  France .................................. 242/118.2

*Primary Examiner*—Vincent P. McGraw
*Attorney, Agent, or Firm*—Bacon & Thomas

[57] ABSTRACT

A packaging apparatus for optical fiber is disclosed. The apparatus allows the fiber to be tested while in the packaged condition.

The apparatus comprises a cylindrical reel and means for mechanically reducing the circumference of the reel comprising a flexible sheath fastened longitudinally to a portion of the reel, thereby defining a longitudinal cavity bounded by said sheath and the surface of a portion of the reel and at least one longitudinally removable spacer member disposed with said sheath, abutting the reel.

12 Claims, 5 Drawing Figures

APPARATUS AND METHOD FOR PACKAGING OPTICAL FIBERS

BACKGROUND OF THE INVENTION

1. Field of the Invention

The present invention is directed to an apparatus for packaging optical fiber which allows the fiber to be tested while in the packaged condition. The invention, thus, eliminates the need to unpackage optical fiber as a prerequisite to testing its particular optical properties.

2. Description of the Prior Art

The use of optical fiber in telecommunications systems has become increasingly prevalent during the past several years. In brief, optical fiber is extremely thin, flexible glass, prepared by drawing glass rods under controlled conditions. Depending upon the specific physical and chemical properties of the fiber, light signals may be transmitted through the fiber with only minimal loss due to attenuation of light through the fiber. To determine whether fiber meets particular transmission specifications, it is necessary to conduct various tests on the fiber. Such tests have been heretofore performed by obtaining a sample of the fiber for testing. Optical fiber is typically prepared as a single, continuous fiber which is wrapped under tension around a reel for storage and shipment to avoid slippage. However, testing requires that the fiber be loose since microbending arising from tight winding against the reel surface increases attenuation of light through the fiber. Thus, in testing it is necessary that the fiber not be under tension on the reel. This is usually accomplished by winding the fiber loosely and re-winding tightly after completion of the tests or by chilling the reel on which the fiber is wound to cause the diameter of the reel to contact, thereby loosening the fiber for testing. The added effort involved in obtaining sample fiber in these procedures significantly increases inspection time which derivatively decreases the production rate of the manufacturer. Additionally, the consumer is required to unpackage the fiber or chill the shipping reel in order to determine if the fiber meets the purchase specification. Thus, there exists a need in the art for a means of testing optical fiber while in the packaged condition so as to eliminate the need to unpackage fiber to accomplish testing.

SUMMARY OF THE INVENTION

Accordingly, it is a primary object of the present invention to provide an apparatus for packaging optical fiber which allows the fiber to be tested while in the packaged condition.

Another object of the present invention is to provide a method for packaging optical fiber which allows the fiber to be subsequently tested without the need to unpackage it.

Still another object of the invention is to provide a method for testing optical fiber wound around a storage reel, without the need to remove it from the reel.

Other objects and advantages of the present invention will become apparent to those of skill in the art upon studying the remaining portions of the disclosure.

The foregoing objects and advantages are achieved by providing an apparatus for packaging optical fibers which is comprised of a cylindrical reel and means for mechanically reducing the circumference of the cylindrical reel. In packaging, the optical fiber is wound tightly around the cylindrical reel. This insures that the fiber will remain securely in position on the reel during storage and shipping. To test the fiber, the circumference of the reel is mechanically reduced, thereby decreasing the tension on the wound fiber and allowing the fiber to be tested while on the reel. After testing, the circumference of the reel is mechanically returned to its original dimension, thereby increasing the tension on the fiber to its original state which maintains it securely in position for storing and/or shipping.

While any apparatus comprising a cylindrical reel and means for mechanically reducing the circumference of said reel is within the scope of the present invention, one such device is contemplated as a preferred embodiment of the invention. This device is comprised of a cylindrical reel having a flexible sheath fastened to a portion of its surface running in a longitudinal direction from one end of the cylinder to the other. The sheath, in this manner, defines a longitudinal cavity which is bounded by the sheath and the underlying surface of the reel. The sheath houses one or more spacer members which may be removed by sliding them in a longitudinal direction out of the sheath. In this manner, the flexible sheath becomes less rigid and collapsible with a minimal amount of pressure.

In packaging, the optical fiber is wound tightly around the apparatus with all spacer members in position within the sheath. This insures that the fiber will remain securely in position on the reel during storage and shipping. To test the fiber, it is only necessary to remove one or more of the spacer members from the sheath. This decreases the tension on the wound fiber and allows it to be tested while on the reel. After the tests are performed, the spacer members are re-inserted into the sheath, thereby increasing the tension of the fiber to its original state which maintains it securely in position for storing and/or shipping.

DETAILED DESCRIPTION OF THE PREFERRED EMBODIMENTS

Figure 1:
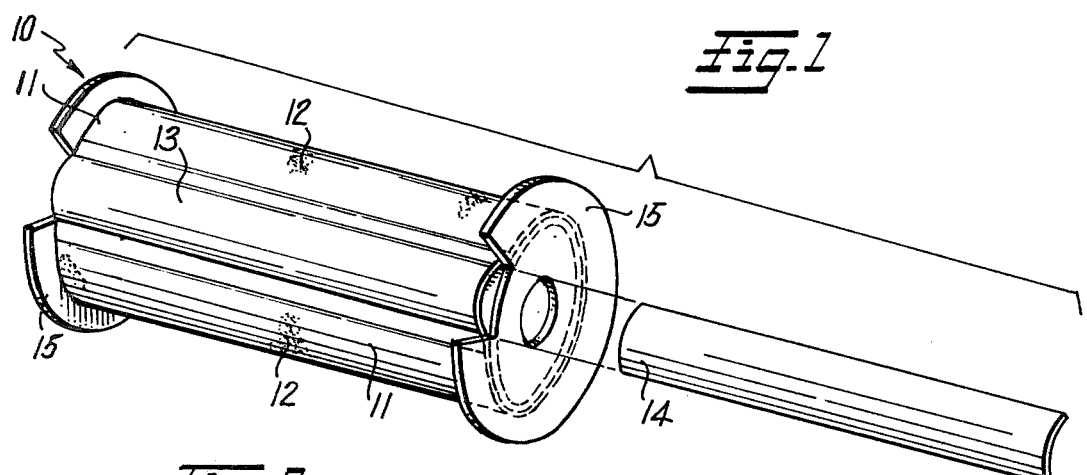
FIG. 1 is an exploded perspective of the packaging device for optical fiber.

The cylindrical reel used in the apparatus of the present invention functions basically as a spool for receiving a single winding of optical fiber. The fiber should preferentially not be wound on top of itself as such contact may damage the fiber when unwound for use. Hence, the diameter and length of the reel is selected so as to allow packaging of the fiber in a single winding. Typically, reel diameters of about 12 inches and lengths of about 12 to 24 inches are employed. However, these dimensions are not critical. The reel may be constructed of any suitable material, such as, wood, plastic or cardboard, although from an economical standpoint cardboard is preferred. To further protect the fiber it is desirable to cover the surface of the reel with a foamed elastomer, such as polyurethane. This material cushions the fiber as it is wound and protects it from fracture during storage and transport. In general, a covering of about ¼ inch thickness is sufficient, although a different thickness may be preferred depending upon storage and shipping conditions. Alternately, it is possible to construct the entire reel from a foamed elastomer, although this is only economically justifiable for expensive orders of fiber.

During packaging, the reel is mounted upon side supports which are attachable to a winding apparatus which rotates the reel in such a manner as to wind the optical fiber along the length of the reel. These side supports are typically flat plates having diameters which are slightly larger than the diameter of the reel, as is typical in spool structures for storing wire cable. In such structures, at least one side support must be given a notch corresponding to the position of the sheath on the reel to allow the spacer members to be removed from the sheath. The side supports may be made of any rigid material such as stiff cardboard or wood.

Along one longitudinal portion of the reel is positioned a flexible sheath which is fastened longitudinally to the surface of the reel so as to form a collapsible cavity which runs over the length of the cylindrical reel upon which the optical fiber is wound. This may be the entire length of the cylinder or only a portion thereof. The sheath may be made of any non-rigid material, such as, plastic, cellophane, paper or fabric. The cavity defined by the sheath and the surface of the reel is basically crescent-shaped having dimensions of about 2 to 3 inches across and about ¼ to ¾ inches in height at the apex. However, it is to be understood that particular dimensions may be selected to suit particular testing requirements.

Into this sheath is inserted one or more spacer members having dimensions slightly less than those of the cavity. When all of these pieces are inserted, they are held securely in position by the sheath and increase the circumference of the reel. According to an alternate embodiment of the present invention, the surface of the reel enveloped by the sheath may be given a grooved configuration corresponding to the curved ends of a spacer member. This configuration facilitates the introduction and removal of the spacer member from the sheath.

The spacer members used in the device of the present invention may be constructed from a variety of rigid materials including, plastic, wood, hard rubber, cardboard, etc. Again, primarily for economic reasons, cardboard is preferred. The spacer members are securely positioned in the sheath and the optical fiber is tightly wound around the reel. In this manner, the fiber is secured against the reel for safe handling. To test the fiber, the spacer members are removed from the sheath, thereby decreasing the circumference of the reel and correspondingly decreasing the tension on the optical fiber. In this loosened condition, the fiber may be tested without removing it from the reel. To facilitate removal of the spacer members it is desirable to construct them so that they are slightly longer than the sheath so that when positioned within the sheath they protrude from one end. When more than one spacer member is housed within the sheath, they may be removed sequentially to obtain different levels of tension until the desired level is obtained. After testing, the spacer members are reinserted into the sheath and the fiber is returned to its taut, packaged condition.

Reference to the figures of drawing provide specific illustrations of various embodiments of the present invention.

FIG. 1 depicts a packaging device in accordance with the present invention composed of a cylindrical reel 10 which is formed from a cardboard tube 11 which is provided with an elastomeric foam coating 12 and notched side supports 15. Sheath 13 is fastened to the surface of the reel, running longitudinally from one end of the reel to the other. Sheath 13 houses spacer member 14 which may be slid out of the sheath to decrease the circumference of the reel as previously described.

Figure 2:
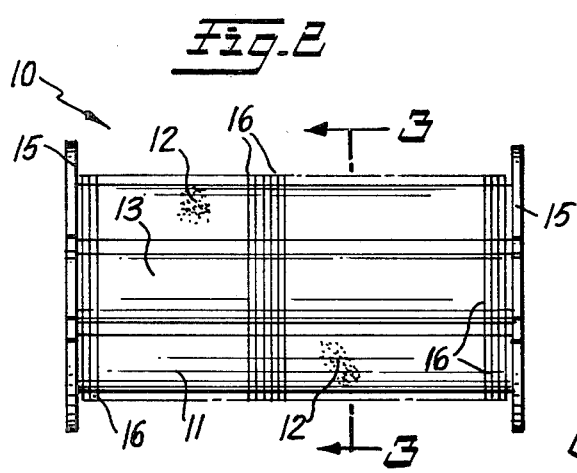
FIG. 2 is a side elevational view of the device of FIG. 1, with optical fiber wrapped thereon.

Optical fibers 16 are wound around the reel as illustrated in FIG. 2.

Figure 3:
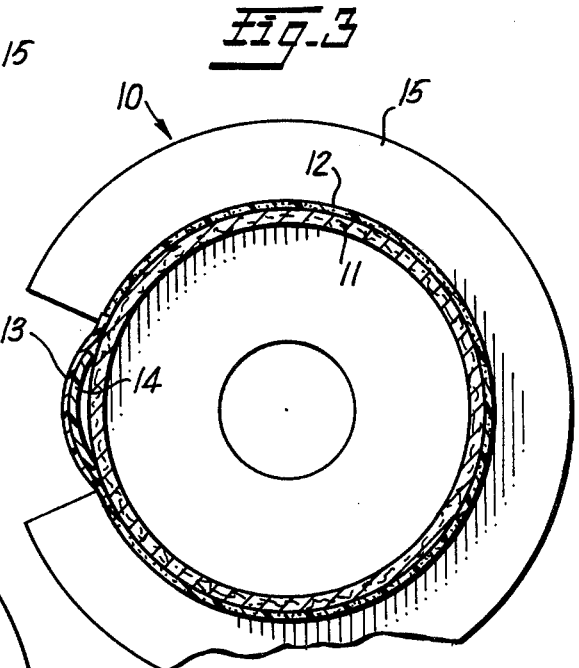
FIG. 3 is an enlarged transverse sectional view, taken on the line 3—3 of FIG. 2.

FIG. 3 depicts a cross-sectional view of the device of FIG. 1 with the spacer member in position within the sheath.

Figure 4:
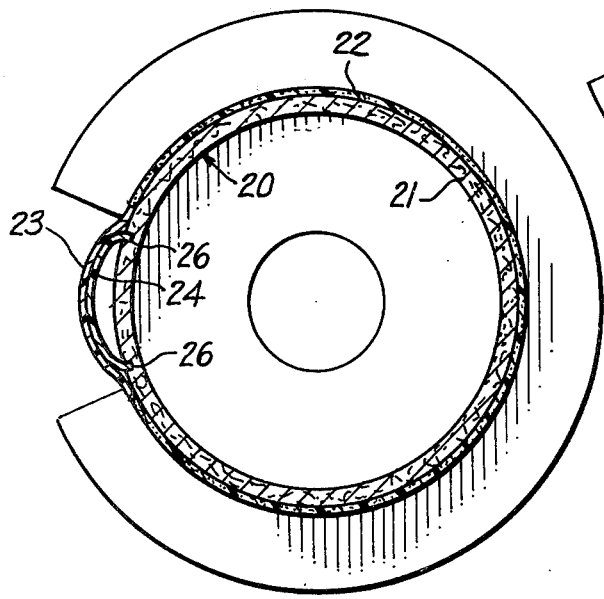
FIG. 4 is a modification of the device shown in FIG. 3.

FIG. 4 represents an alternate embodiment of the present invention in which the spacer member 24 is inserted within grooves 26 in the surface of reel 20 formed by cardboard tube 21 having elastomeric foam coating 22. The grooved configuration facilitates entry and exit of spacer member 24 from sheath 23.

Figure 5:
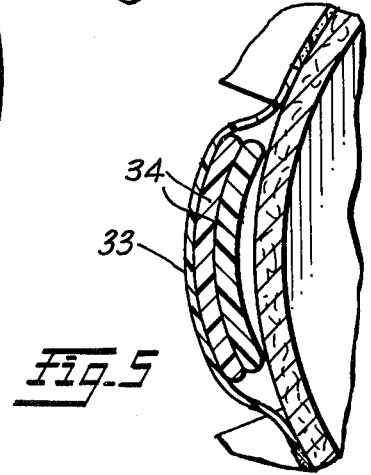
FIG. 5 is a sectional view of a preferred embodiment of the invention.

Lastly, FIG. 5 illustrates the use of a plurality of spacer members 34 which may be sequentially removed from the sheath 33 to provide varying levels of tension for the wound fibers.

The apparatus depicted in the Figures of Drawing, thus, provides a method for testing optical fiber wound around a storage reel without the need to remove a sample of the fiber from the reel. Although this apparatus represents a preferred means for conducting the testing method, it is understood that any cylindrical reel containing means for mechanically reducing its circumference would be operable. For example, a cylindrical reel provided with a screw mechanism whereby the circumference is increased or decreased by adjusting a screw-type device would function effectively in the method of the invention. Thus, while the present invention has been described in terms of various preferred embodiments, those of skill in the art will recognize that various additions, modifications, and omissions may be made without departing from the spirit thereof. Accordingly, it is intended that the scope of the present invention be limited solely by that of the claims which follow.

What is claimed is:

1. A device for packaging optical fibers comprising:
  (a) a cylindrical reel; and,
  (b) means for mechanically reducing the circumference of said reel comprising:
    (i) a flexible sheath fastened longitudinally to a portion of said reel, thereby defining a longitudinal cavity bounded by said sheath and the surface of a portion of said reel; and,
    (ii) at least one longitudinally removable spacer member disposed with said sheath, abutting said reel.

2. The device as defined by claim 1, further comprising optical fiber wound around the circumference of said device.

3. The device as defined by claim 1, wherein the surface of said cylindrical reel is coated with a foamed elastomer.

4. The device as defined by claim 1, wherein said flexible sheath runs longitudinally from one end of said reel to the other end.

5. The device as defined by claim 1, wherein said at least one removable spacer member protrudes from at least one end of said cavity.

6. The device as defined by claim 1, wherein said flexible sheath is composed of a material selected from the group consisting of a thermoplastic polymeric material, paper and woven or non-woven fabric.

7. The device as defined by claim 1, wherein said at least one longitudinally removable spacer member is composed of a material selected from the group consisting of cardboard, plastic, hard rubber, and wood.

8. The device as defined by claim 1, wherein a plurality of longitudinally removable spacer members are disposed within said sheath in a radially adjacent configuration.

9. The device as defined by claim 1, wherein said cylindrical reel is attached to side supports at each end, said side supports having a diameter slightly larger than that of the reel and including a notched opening to allow said spacer members to be longitudinally removed from said sheath.

10. A method for testing optical fiber wound around a storage reel comprising:
 (a) winding the optical fiber on a device comprising:
  (i) a cylindrical reel,
  (ii) a flexible sheath fastened longitudinally to a portion of said reel, thereby defining a longitudinal cavity bounded by said sheath and the surface of a portion of said reel, and,
  (iii) at least one longitudinally removable spacer member disposed within said sheath, abutting said reel;
 (b) removing at least one of said spacer members from its position within said sheath, thereby loosening the fibers wound on the reel; and,
 (c) conducting the desired test or tests on the loosened optical fibers.

11. The method as defined by claim 10, wherein said at least one spacer member is re-inserted into said sheath, thereby tightening the optical fibers against the surface of said reel.

12. The method as defined by claim 10, wherein a plurality of spacer members are sequentially removed from said sheath, thereby providing varying levels of tension for the optical fiber.

* * * * *